United States Patent
Nicolaescu et al.

(10) Patent No.: US 7,437,026 B2
(45) Date of Patent: Oct. 14, 2008

(54) THREE DIMENSIONAL SEMICONDUCTOR BASED OPTICAL SWITCHING DEVICE

(75) Inventors: Remus Nicolaescu, San Francisco, CA (US); Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 10/947,633

(22) Filed: Sep. 22, 2004

(65) Prior Publication Data

US 2006/0083465 A1 Apr. 20, 2006

(51) Int. Cl.
*G02F 1/295* (2006.01)
(52) U.S. Cl. .......................................... 385/8
(58) Field of Classification Search ................. None
See application file for complete search history.

(56) References Cited

U.S. PATENT DOCUMENTS

| | | | |
|---|---|---|---|
| 3,957,341 A | 5/1976 | Taylor | |
| 4,082,419 A | 4/1978 | Thompson et al. | |
| 4,787,691 A | 11/1988 | Lorenzo et al. | |
| 4,869,569 A | 9/1989 | Kapon | |
| 5,125,065 A | 6/1992 | Stoll et al. | |
| 5,159,699 A * | 10/1992 | de Monts | 385/14 |
| 5,862,276 A | 1/1999 | Karras | |
| 5,908,305 A | 6/1999 | Crampton et al. | |
| 6,002,823 A | 12/1999 | Chandross et al. | |
| 6,144,779 A | 11/2000 | Binkley et al. | |
| 6,253,000 B1 | 6/2001 | Madsen et al. | |
| 6,292,597 B1 | 9/2001 | Lagali et al. | |
| 7,013,070 B2 * | 3/2006 | Nicolaescu | 385/50 |
| 7,095,920 B1 * | 8/2006 | Little | 385/30 |
| 2003/0223698 A1 * | 12/2003 | Nicolaescu | 385/50 |

FOREIGN PATENT DOCUMENTS

WO  WO 00/72064 A1  11/2000

OTHER PUBLICATIONS

Soref, R.A., et al., "Vertically Integrated Silicon-on-Insulator Waveguides," IEEE Photonics Technology Letters, vol. 3, No. 1, Jan. 1991, pp. 22-24.

Bachmann, M., et al., "General Self-Imaging Properties In NxN Multimode Interference Couplers Including Phase Relations," Applied Optics, vol. 33, No. 18, Jun. 20, 1994, pp. 3905-3911.

(Continued)

*Primary Examiner*—Michelle R. Connelly-Cushwa
*Assistant Examiner*—Chris Chu
(74) *Attorney, Agent, or Firm*—Blakely, Sokoloff, Taylor & Zafman LLP

(57) ABSTRACT

A device with optical switching between multiple layers of a semiconductor die is disclosed. In one aspect of the present invention, the disclosed apparatus includes a first semiconductor material layer of a semiconductor die. The first semiconductor material layer has a first optical waveguide. A second semiconductor material layer is also included in the semiconductor die. The second semiconductor material layer has a second optical waveguide. An insulating layer is disposed between the first and second semiconductor material layers such that there is an evanescent coupling between the first and second semiconductor material layers. There are modulated charge layers proximate to the insulating layer such that a coupling length of the evanescent coupling is controlled in response to the modulated charge layers.

20 Claims, 6 Drawing Sheets

OTHER PUBLICATIONS

Soldano, L.B., et al., "Optical Multi-Mode Interference Devices Based on Self-Imaging: Principles and Applications," Journal of Lightwave Technology, vol. 13, No. 4, Apr. 1995, pp. 615-627.

Rasmussen, T., et al, "Design and Performance Evaluation of 1-by-64 Multimode Interference Power Splitter for Optical Communications," Journal of Lightwave Technology, vol. 13, No. 10, Oct. 1995, pp. 2069-2074.

Smit, M.K., et al., "Phasar-Based WDM-Devices: Principles, Design and Applications," IEEE Journal of Selected Topics In Quantum Electronics, vol. 2, No. 2, Jun. 1996, pp. 236-250.

Rajarajan, M. et al., "Accurate Analysis of MMI Devices with Two-Dimensional Confinement," Journal of Lightwave Technology, vol. 14, No. 9, Sep. 1996, pp. 2078-2084.

Karrenahalli, S., et al., "Experimental Confirmation of Phase Relationships of Multimode Interference Splitters Using a Shearing-Type Near-Field Sagnac Interferometer," IEEE Photonics Technology Letters, Jul. 1997, pp. 937-939.

Lorenzo, R.M., et al., "Improved Self-Imaging Characteristics in 1xN Multimode Couplers," IEEE Proc.-Optoelectron, vol. 145, No. 1, Feb. 1998, pp. 65-69.

* cited by examiner

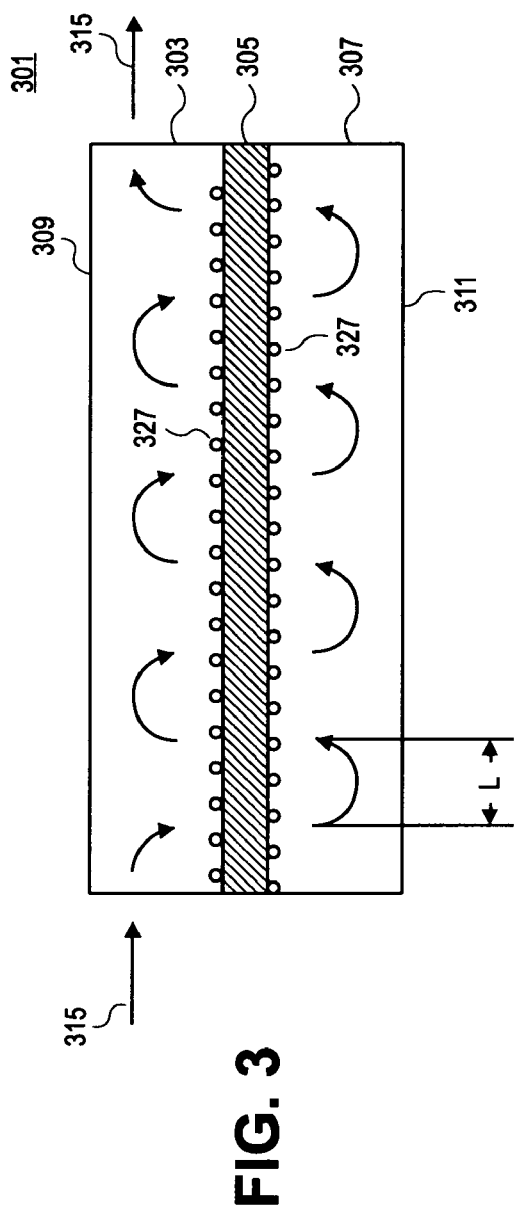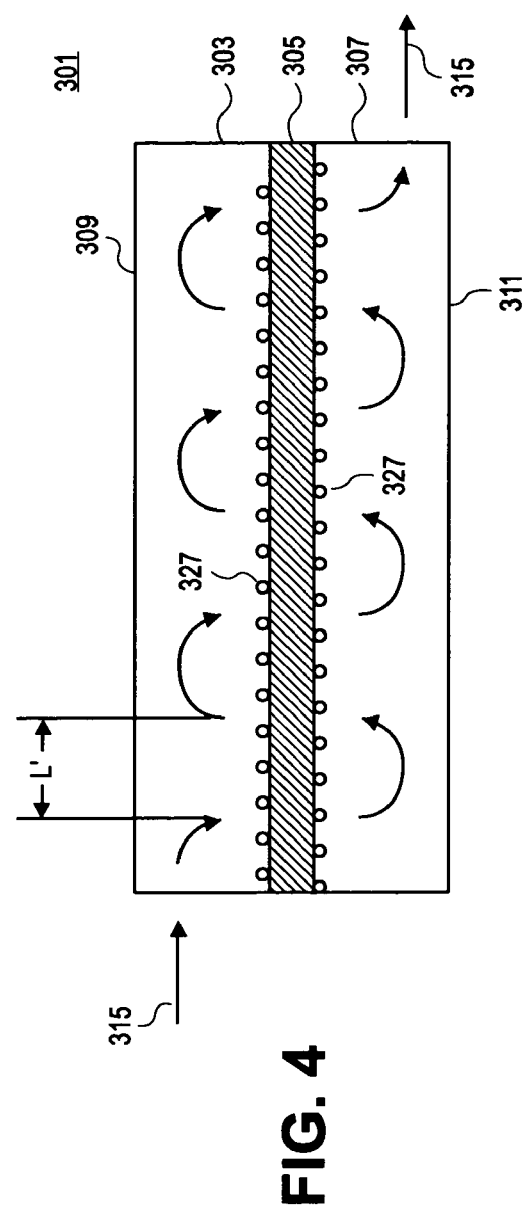

THREE DIMENSIONAL SEMICONDUCTOR BASED OPTICAL SWITCHING DEVICE

BACKGROUND OF THE INVENTION

1. Field of the Invention

The present invention relates generally to optical signals and, more specifically, the present invention relates to switching optical signals.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds. In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is an illustration showing an evanescent coupling having a first coupling length of an optical beam through an insulating region between waveguides of one embodiment of an optical device in accordance with the teachings of the present invention.

FIG. 4 is an illustration showing an evanescent coupling having a second coupling length of the optical beam through the insulating region between waveguides of one embodiment of an optical device in accordance with the teachings of the present invention.

DETAILED DESCRIPTION

Methods and apparatuses for switching an optical beam between multiple semiconductor material layers of a semiconductor die are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
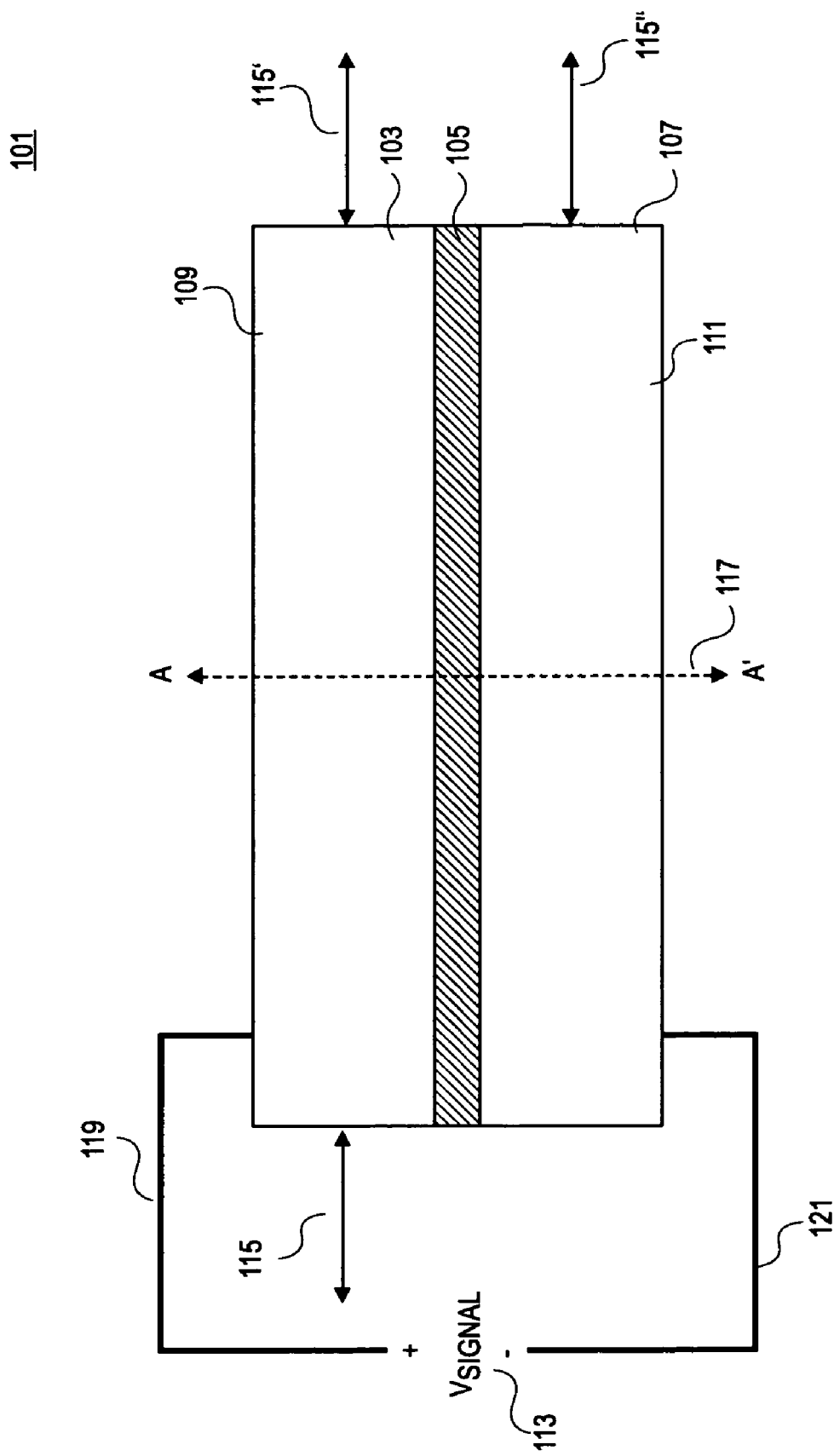
FIG. 1 is a side view diagram of one embodiment of an optical device in accordance with the teachings of the present invention.

FIG. 1 is a block diagram illustrating one embodiment of an optical device 101 in accordance with the teachings of the present invention. As shown in the depicted embodiment, optical device 101 is a three dimensional multiplane device that includes multiple semiconductor material layers. For instance, FIG. 1 shows that one embodiment of optical device 101 includes a semiconductor material layer 103 and a semiconductor material layer 107, which are separated by an insulating layer 105. In one embodiment, insulating layer 105 includes an oxide, such as for example silicon oxide, which isolates semiconductor material layer 103 from semiconductor material layer 107. In one embodiment, insulating layer 105 is approximately 200 angstroms in thickness. In other embodiments, insulating layer may have a different thickness. In one embodiment, optical device 101 may be included on a semiconductor die fabricated for example on a silicon-on-insulator (SOI) wafer and semiconductor material layers 103 and 107 are the different silicon layers fabricated disposed in the semiconductor die. In other embodiments, other suitable semiconductor materials may be used for semiconductor material layers 103 and 107, such as for example polysilicon, III-V semiconductor materials, or the like. In one embodiment, the planes of semiconductor material layers 103 and 107 are substantially parallel to the plane of a surface of the semiconductor die or SOI wafer in which optical device 101 is fabricated.

As shown in FIG. 1, a signal $V_{SIGNAL}$ 113 is applied in one embodiment to semiconductor material layers 103 and 107 to adjust a coupling strength or the isolation between the different semiconductor material layers in optical device 101 in accordance with the teachings of the present invention. In one embodiment, an optical waveguide 109 is disposed in semiconductor material layer 103 and an optical waveguide 111 is disposed in semiconductor material layer 107. In one embodiment, optical waveguides 109 and 111 are single mode waveguides. In one embodiment, optical waveguides 109 and 111 are two planar waveguides situated on top of each other in optical device 101.

In operation a signal $V_{SIGNAL}$ 113 is applied through electrodes 119 and 121 to semiconductor material layers 103 and 107 to modulate an electric field across insulating layer 105 to control modulated charge layers proximate to insulating layer 105. In one embodiment, electrodes 119 and 121 are electrically connected to semiconductor material layers 103 and 107 at locations outside the optical paths through optical waveguides 109 and 111. In one embodiment, the modulated charge layers proximate to insulating layer 105 result in thin horizontal charge layers that control the optical coupling strength or isolation between optical waveguides 109 and 111 of semiconductor material layers 103 and 107. In one embodiment, the modulated charge layers have a charge density of approximately $5 \times 10^{19}$ cm$^{-3}$ and a thickness of approximately 10 nanometers. In other embodiments, other suitable charge densities and thicknesses may be employed in accordance with the teachings of the present invention.

For purposes of this disclosure, the horizontal orientation of the thin horizontal charge layers proximate to insulating layer 105 are with respect to the plane of semiconductor material layers 103 and 107, which are understood to be substantially parallel to a plane of a surface of the semiconductor die or SOI wafer in which optical device 101 is fabricated. In one embodiment, a capacitive structure is defined with the modulated charge layers proximate and insulating layer 105 between semiconductor material layers 103 and 107. The capacitive structure approach employed with embodiments of the present invention provide optical device 101 with high speed response to $V_{SIGNAL}$ 113 in accordance with the teachings of the present invention.

In operation, an optical beam 115 is launched or directed into semiconductor material waveguide through optical waveguide 109. As optical beam 115 propagates along optical waveguide 109, evanescent coupling occurs between optical waveguides 109 and 111 across insulating layer 105. The modulated charger layers proximate to insulating layer 105 control the coupling strength or isolation between the adjacent or neighboring optical waveguides 109 and 111 in semiconductor material layers 103 and 107. By controlling the coupling strength or isolation in response to $V_{SIGNAL}$ 113, optical beam 115 is selectively directed out from optical device 101 through either optical waveguide 109 or optical waveguide 111 in accordance with the teachings of the present invention. Therefore, optical beam 115 may be switched between the different multiple semiconductor material layers 103 and 107 of the semiconductor die in response to $V_{SIGNAL}$ 113 in accordance with the teachings of the present invention. In other embodiments, additional semiconductor material layers may be included in accordance with the teachings of the present invention.

For illustration purposes, depending on $V_{SIGNAL}$ 113, FIG. 1 shows that optical beam 115 leaves optical device 101 through optical waveguide 109 as optical beam 115' in response to $V_{SIGNAL}$ 113. In the alternative, optical beam 115 is illustrated leaving optical device 101 through optical waveguide 111 as optical beam 115" in response to $V_{SIGNAL}$ 113. As illustrated in the embodiment of FIG. 1, light may also propagate in the opposite direction in accordance with the teachings of the present invention.

Figure 2:
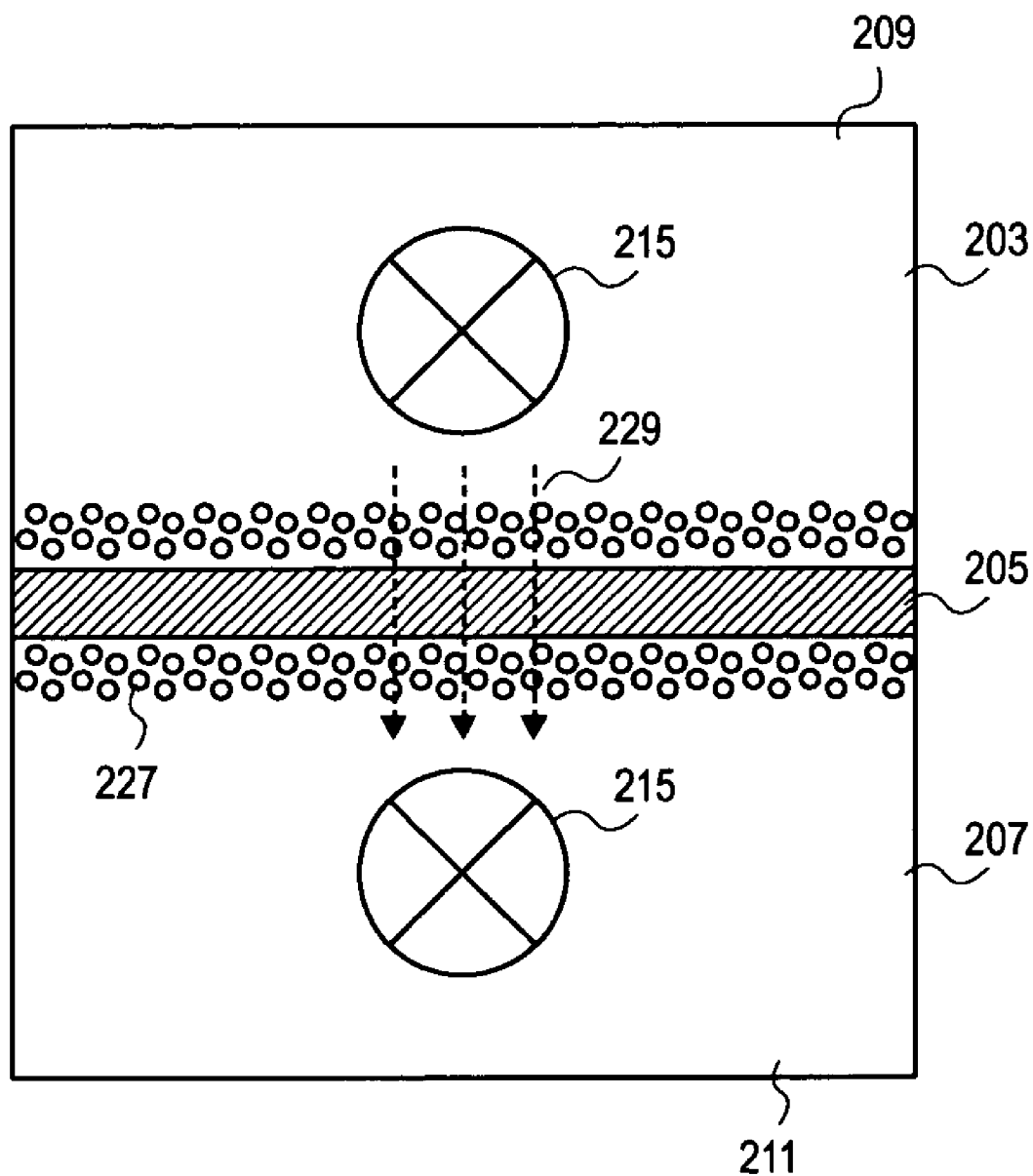
FIG. 2 is a cross section diagram of one embodiment of an optical device in accordance with the teachings of the present invention.

FIG. 2 is a cross-section illustration of an embodiment of an optical device 201, which corresponds to a cross-section illustration along dashed line A-A' 117 of FIG. 1 through optical device 101. As shown in the depicted embodiment, optical device 201 has multiple semiconductor material layers including a semiconductor material layer 203 and a semiconductor material layer 207 with an insulating layer 205 disposed between semiconductor material layers 203 and 207. An optical waveguide 209 is included in semiconductor material layer 203 and an optical waveguide 211 is included in semiconductor material layer 207.

As shown, charge layers 227 are formed proximate to insulating layer 205 in one embodiment resulting in horizontal layers of charge. Depending on the doping included in the semiconductor material layers 203 and 207, charge layers 227 may include electrons, holes or a combination thereof. In addition, optical device may be biased to operate in accumulation mode, inversion mode or depletion mode. A capacitive structure is defined with charge layers 227, forming the plates of a capacitor separated by insulating layer 205.

In operation, an optical beam 215 may be launched or directed into optical waveguide 209 in semiconductor material layer 203. Optical beam 215 is illustrated in FIG. 2 going through the page. When optical beam 215 propagates next to insulating layer 205, an evanescent coupling 229 occurs through insulating layer 205 such that optical beam 215 propagates from waveguide 209 to optical waveguide 211 in semiconductor material layer 207. In one embodiment, charge layers 227 are modulated to control the effective index of refraction through insulating layer 205 in response to charge layers 227 due to the plasma optical effect. Therefore, the coupling strength of the evanescent coupling 229 may be tuned or adjusted in one embodiment in response to the concentration of free charge carriers in modulated charge layers 227.

The plasma optical effect arises due to an interaction between the optical electric field vector and free charge carriers that may be present along the propagation path of the optical beam 215 along evanescent coupling 229. The electric field of the optical beam 215 induces a change in the velocity of the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. The free charge carriers are accelerated by the field and also lead to absorption of the optical field as optical energy is used up. Generally the index of refraction perturbation is a complex number with the real part being that part which causes the velocity change and the imaginary part being related to the free charge carrier absorption. The amount of phase shift ϕ is given by $$\phi = (2\pi/\lambda)\Delta nL \quad \text{(Equation 1)}$$

with the optical wavelength in vacuum λ the interaction length L. In the case of the plasma optical effect in silicon, the refractive index change Δn due to the electron ($\Delta N_e$) and hole ($\Delta N_h$) concentration change is given by:

$$\Delta n = -\frac{e^2 \lambda^2}{8\pi^2 c^2 \varepsilon_0 n_0}\left(\frac{\Delta N_e}{m_e^*} + \frac{\Delta N_h}{m_h^*}\right) \quad \text{(Equation 2)}$$

where $n_o$ is the nominal index of refraction for silicon, e is the electronic charge, c is the speed of light, $\epsilon_0$ is the permittivity of free space, $m_e^*$ and $m_h^*$ are the electron and hole effective masses, respectively.

Therefore, as will be discussed in further detail below, the coupling strength of the evanescent coupling 229 is responsive in one embodiment to the free charge carrier concentration in modulated charge layers 227. In one embodiment, the free charge carrier concentration in modulated charge layers 227 is responsive to an applied signal, such as for example signal $V_{SIGNAL}$ 113 of FIG. 1.

To illustrate, FIGS. 3 and 4 are illustrations of one embodiment of an optical device 301 with multiple semiconductor material layers including a semiconductor material layer 303 and a semiconductor material layer 307, separated by an insulating layer 305. In the illustrated embodiment, optical waveguide 309 is included in semiconductor material layer 309 and optical waveguide 311 is included in semiconductor material layer 307. Modulated charge layers 327 are proximate to insulating layer 309. For explanation purposes, modulated charge layers 327 are modulated in FIG. 4 to have a greater free charge carrier concentration than the charge carrier concentration of modulated charge layers 327 in FIG. 3.

In operation, optical beam 315 is launched or directed into optical waveguide 305. For explanation purposes, it is noted that optical beam 315 is illustrated as propagating in a direction from the bottom of the illustration to the top of the illustration. It is noted that optical beam 315 may also propagate in the opposite direction and is therefore may be bi-directional in accordance with the teachings of the present invention. As optical beam 315 propagates along optical waveguide 305, it is evanescently coupled up and down or back and forth between the different semiconductor material layers 303 and 307 of optical device 301 as shown. In one embodiment, the coupling strength or isolation between the optical waveguides 309 and 311 is responsive to the free charge carrier concentration in modulated charge layers 327. Accordingly, the coupling length L, as illustrated in FIG. 3, and illustrated as L' in FIG. 4 is responsive to modulated charge layers 327.

In the example illustrated in FIG. 3, the free charge carrier concentration of modulated charge layers 327 is such that the coupling strength or isolation between the optical waveguides 309 and 311 results in a coupling length L, which results in optical beam 315 exiting optical device 301 via optical waveguide 309. In contrast, modulated charge layers 327 are modulated in FIG. 4 such that coupling length L' has a value that results in optical beam 315 exiting the optical device 301 via optical waveguide 311 since the geometry and the total length of the optical device 301 is fixed. Therefore, in the example embodiments illustrated in FIGS. 3 and 4, optical device 301 functions as shown to operate as a 1×2 switch in accordance with the teachings of the present invention.

In another embodiment, another optical beam may also be launched or directed into optical waveguide 311 and optical device 301 therefore would operate as a 2×2 switch. In addition, depending on the free charge carrier concentration of modulated charge layers 327 and the resulting the coupling lengths L and/or L", optical device 301 also functions as an amplitude modulator and/or a variable optical attenuator. Indeed, the amplitudes of optical beam 315 as it is output from either optical waveguide 309 or 311 is modulated in response to the coupling lengths L or L', which are modulated in response to modulated charge layers 327.

Figure 5:
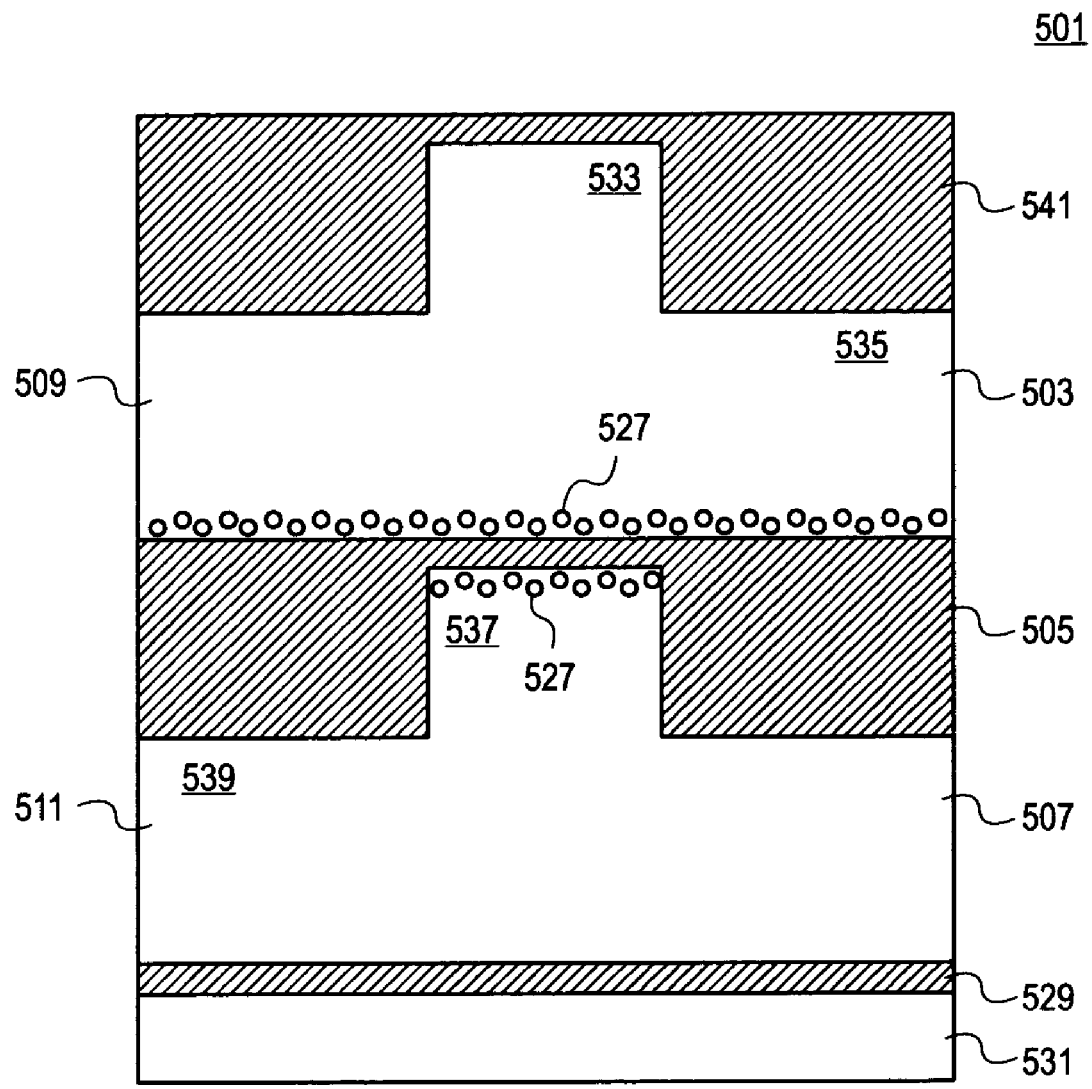
FIG. 5 is another cross-section diagram through one embodiment of an optical device having relatively horizontal charge layers and multiple rib waveguides in accordance with the teachings of the present invention.

FIG. 5 provides another cross-section illustration of one embodiment of an optical device 501 in accordance with the teachings of the present invention. In one embodiment, the cross-section illustration in FIG. 5 also represents a cross-section illustration along dashed line A-A' 117 of FIG. 1 through optical device 101. As illustrated in FIG. 5, optical device 501 has multiple semiconductor material layers including a semiconductor material layer 503 and a semiconductor material layer 507 with an insulating layer 505 disposed between semiconductor material layers 503 and 507. In one embodiment, optical device 501 is fabricated on a semiconductor die or an SOI wafer with semiconductor material layer 531 being one of the layers on the semiconductor die or SOI wafer and an insulating layer 529 being a buried oxide layer of the semiconductor die or SOI wafer. In one embodiment, an optical waveguide 509 is included in semiconductor material layer 503 and an optical waveguide 511 is included in semiconductor material layer 507. In one embodiment, optical waveguide 509 is a rib waveguide having a rib region 533 and a slab region 535, and optical waveguide 511 is a rib waveguide having a rib region 537 and a lab region 539. As such, the rib region 537 of optical waveguide 511 is situated in Figure as being below the slab region 535 of optical waveguide 509 across the insulating layer 505 in the depicted embodiment.

As shown, charge layers 527 are formed proximate to insulating layer 505 in one embodiment resulting in horizontal layers of charge in the depicted embodiment. Depending on the doping included in the semiconductor material layers 503 and 505, charge layers 527 may include electrons, holes or a combination thereof. In addition, optical device 501 may be biased to operate in accumulation mode, inversion mode or depletion mode. A capacitive structure is defined with charge layers 527, forming the plates of a capacitor separated by insulating layer 505.

In operation, an optical beam propagating through one of the semiconductor material layers of optical device 501 is selectively switched to another one of the semiconductor material layers of optical device 501 in response charge layers 527 in accordance with the teachings of the present invention. For instance, an optical beam propagating through optical waveguide 509 is switched to optical waveguide 511 from slab region 535 through insulating layer 505 to rib region 537 into optical waveguide 511 in accordance with the teachings of the present invention. An optical beam propagating through optical waveguide 511 is switched to optical waveguide 509 from rib region 537 through insulating layer 505 to slab region 535 into optical waveguide 509 in accordance with the teachings of the present invention.

In one embodiment, additional semiconductor material layers with respective optical waveguides and intervening insulating layers with charge layers may be included in optical device 501 in accordance with the teachings of the present invention. As such, an optical beam propagating through one of the semiconductor material layers may be switched to a neighboring semiconductor material layer, above or below depending on the relative orientation of optical device 501, by controlling the evanescent coupling between the different semiconductor material layers in optical device 501 in accordance with the teachings of the present invention. As a result, a relatively vertical evanescent coupler is realized with optical device 501 and may be included for example in a three dimensional multiplanar or multilayer integrated optical circuit device in accordance with the teachings of the present invention.

Figure 6:
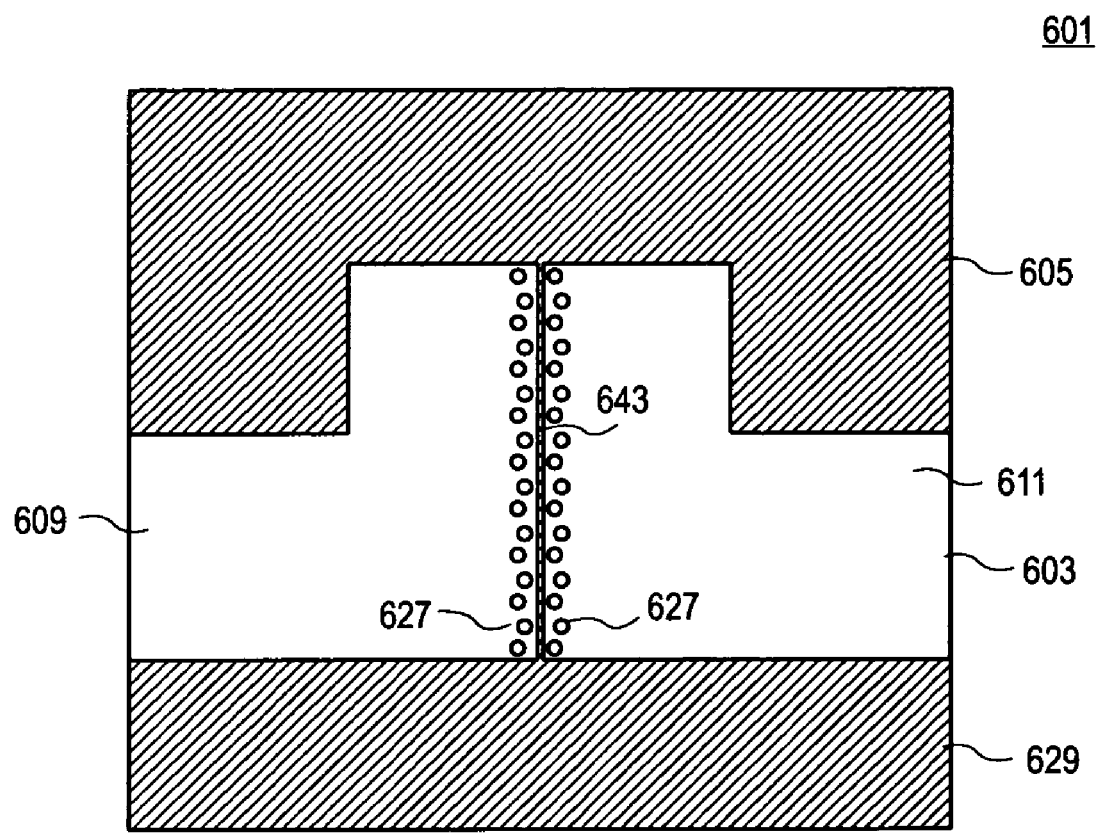
FIG. 6 is another cross-section diagram through another embodiment of an optical device having relatively vertical charge layers and multiple waveguides in accordance with the teachings of the present invention.

FIG. 6 shows a cross-section illustration of one embodiment of an optical device 601 with relatively horizontal evanescent coupling in accordance with the teachings of the present invention. As illustrated in FIG. 6, optical device 601 has similarities with the previously described embodiments with an exception that the charge layers are vertical with respect to the optical waveguides instead of horizontal. Stated in a different way, the charges layers in optical device 601 are orthogonal relative to or with respect to the charge layers of, for example, optical devices 101, 201, 301 or 501. Optical device 601 includes a semiconductor material layer 603 disposed between an insulating layer 629 and an insulating layer 605. In one embodiment, optical device 601 is included in a semiconductor die or an SOI wafer and insulating layer 629 is a buried oxide layer of the semiconductor die or SOI wafer. The embodiment illustrated in FIG. 6 also shows that semiconductor material layer 603 includes an insulating region 643 separating an optical waveguide 609 and an optical waveguide 611. As shown, modulated charge layers 627 are modulated proximate to insulating region 643 in an embodiment.

As shown, modulated charge layers 627 in FIG. 6 provide a thin vertical layer of charge to control the coupling strength between adjacent neighboring optical waveguides 609 and 611. For purposes of this disclosure, the vertical orientation of charge layers 627 and insulating region 643 is with respect to a plane of semiconductor material layers 603, which is understood to be substantially parallel to a plane of a surface of the semiconductor die or SOI wafer in which optical device 601 is disposed. Therefore, in the illustrated embodiment, charge layers 627 and insulating region 643 are substantially perpendicular or orthogonal with respect to the plane of the surface of the semiconductor die or SOI wafer in which optical device 601 is disposed.

In one embodiment, the cross-section portion of optical device 601 may be characterized as a two mode waveguide in which an insulating region 643 is inserted in the middle, which therefore vertically isolates the two halves of the two mode waveguide. In the alternative, the cross-section portion of optical device 601 may also be characterized as two single mode asymmetric waveguides separated by a thin layer of oxide. Indeed, as shown in the illustrated embodiment, an optical rib waveguide is formed with insulating region 643 separating the optical waveguides 609 and 611. In one embodiment, the modulated electric field across the insulating region 643 is approximately 10 MV/cm. In this embodiment, modulated charge layers 627 drop the index of refraction by approximately 0.02. In one embodiment, insulating region 643 is made of silicon oxide and is approximately 200 angstroms thick.

In other embodiments, other suitable materials and that other suitable values and geometries may be utilized for those described in this disclosure in accordance with the teachings of the present invention.

In one embodiment, the optical beams that are directed through the optical devices described in this disclosure include infrared or near infrared light or any other suitable wavelength of light that may propagate through semiconductor material layers of the embodiments of optical devices described herein. In one embodiment, the optical beams are polarized in a direction parallel to the respective insulating layers 105, 205, 305, 505 or 627, which separate the optical waveguides included in the optical devices described in this disclosure.

Figure 7:
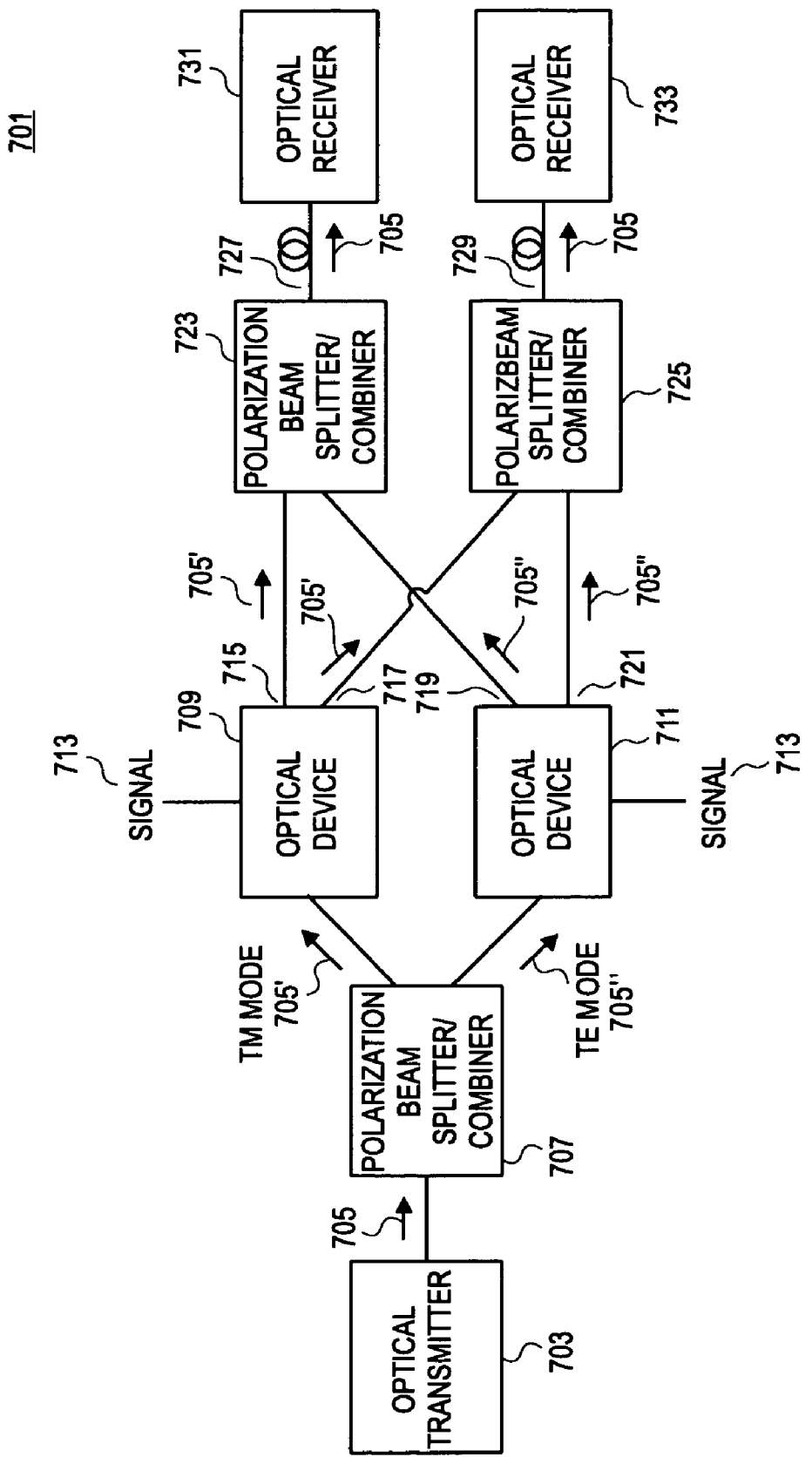
FIG. 7 is a block diagram illustration of one embodiment of a system including embodiments of multiple optical devices employed in a polarization insensitive optical switch according to embodiments of the present invention.

FIG. 7 is a diagram illustrating one embodiment of a system 701 including embodiments of optical devices to realize a polarization insensitive optical switching device in accordance with the teachings of the present invention. As shown in the depicted embodiment, an optical transmitter 703 transmits an optical beam 705 to a polarization beam splitter/combiner 707. In one embodiment, optical beam 705 is an unpolarized optical beam. Polarization beam splitter/combiner 707 separates the transverse magnetic field (TM) mode 705' polarization component of optical beam 705 from the transverse electric field (TE) mode 705" polarization component of optical beam 705. Thus, optical beam 705 is split into two orthogonal polarization components, TM mode 705' and TE mode 705". The TM mode 705' is sometimes referred to as the vertical polarization state and the TE mode 705" is sometimes referred to as the horizontal polarization state. The optical beams may propagate bi-directionally through polarization beam splitter/combiner 707, and therefore in one embodiment, the polarization beam splitter/combiner 707 may further serves as a polarization beam combiner to combine the TM mode and TE mode polarization components of the optical beams.

In the illustrated embodiment, the TM mode 705' is directed into an optical device 709 and the TE mode 705" is directed into an optical device 711. In one embodiment, optical devices 709 and 711 are similar to embodiments of optical devices discussed previously, such as for example optical devices 101, 201, 301, 501 or 601. In one embodiment, optical devices 709 and 711 are disposed on the same semiconductor die such that a polarization insensitive optical switch is provided on a monolithic device in accordance with the teachings of the present invention. In another embodiment, optical devices 709 and 711 may be included in separate semiconductor dice.

In the illustrated embodiment, the incoming optical beam 705' or 705" to optical devices 709 or 711, respectively, includes light that is polarized parallel to the charge layers included in the respective optical device 709 or 711. Therefore, assuming for example that the TM mode 705' is vertically polarized, then optical device 709 may be similar to an embodiment of optical device 601 of FIG. 6, since the charge layers 627 have a relatively vertical orientation. Similarly, assuming for example that the TE mode 705" is horizontally polarized, then optical device 711 may be similar to one of the embodiments of optical device 101, 201, 301 or 501, since in these embodiments, the charge layers have a relatively horizontal orientation. Therefore, in one embodiment, the charge layers included in optical devices 709 and 711 are relatively orthogonal with respect to each other in accordance with the teachings of the present invention.

In another embodiment, the charge layers included in optical devices 709 and 711 may have the same orientation. In other words, the charges layers may all be horizontal, or the charge layers may all be vertical, or the charge layers of the optical devices 709 and 711 may be relatively parallel with one another. In such an embodiment, the incoming optical beams are rotated as necessary with for example a waveplate or other suitable device situated in front of the inputs to optical devices 709 and 711 such that the incoming optical beams to optical devices 709 and 711 includes light that is polarized parallel with the charge layers included in the respective optical device 709 or 711 in accordance with the teachings of the present invention.

In the depicted embodiment, 1×2 optical switches are implemented with optical devices 709 and 711. In operation, optical device 709 switches TM mode 705' to either output 715 or 717 of optical device 709 in response to a signal 713 in accordance with the teachings of the present invention. Similarly, optical device 711 switches TE mode 705" to either output 719 or 721 of optical device 711 in response to a signal 713 as well in accordance with the teachings of the present invention.

As shown in the depicted embodiment, assuming outputs 715 and 719 were selected by signal 713, polarization beam splitter/combiner 723 is coupled to receive the TM and TE modes 705' and 705" from outputs 715 and 719, respectively. In accordance with the teachings of the present invention, polarization beam splitter/combiner 723 then combines the TM and TE mode components 705' and 705" and then outputs optical beam 705 to optical receiver 731 as shown in FIG. 7. In one embodiment, an optical fiber 727 is included between polarization beam splitter/combiner 723 and optical receiver 731 to direct optical beam 705 from polarization beam splitter/combiner 723 to optical receiver 731.

Similarly, assuming outputs 717 and 721 were instead selected by signal 713, polarization beam splitter/combiner 725 is coupled to receive the TM and TE mode components 705' and 705" from outputs 717 and 721, respectively. In accordance with the teachings of the present invention, polarization beam splitter/combiner 725 then combines the TM and TE mode components 705' and 705" and then outputs optical beam 705 as shown in FIG. 7.

In one embodiment, an optical fiber 729 is included between polarization beam splitter/combiner 725 and optical receiver 733 to direct optical beam 705 from polarization beam splitter/combiner 725 to optical receiver 733.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
    a first semiconductor material layer of a semiconductor die, the first semiconductor material layer having a first optical waveguide;
    a second semiconductor material layer of the semiconductor die, the second semiconductor material layer having a second optical waveguide;
    an insulating layer disposed between the first and second semiconductor material layers such that there is an evanescent coupling between the first and second semiconductor material layers; and
    a pair of electrodes respectively coupled to the first and second optical waveguides to modulate charge layers proximate to the insulating layer such that a coupling length of the evanescent coupling is controlled in response to the modulated charge layers, wherein an optical beam directed through the first and second optical waveguides includes first polarization component and a second polarization component, the first polarization component being transverse magnetic mode and the second polarization component being transverse electric mode.

2. The apparatus of claim 1 wherein the modulated charge layers proximate the insulating layer are substantially parallel to a surface of the semiconductor die.

3. The apparatus of claim 1 wherein the first optical waveguide is a first rib waveguide and the second optical waveguide is a second rib waveguide.

4. The apparatus of claim 3 wherein the evanescent couplin is between a slab region of the first rib waveguide and a rib region of the second rib waveguide through the modulated charge layers.

5. The apparatus of claim 1 wherein a capacitive structure is defined with the modulated charge layers and the insulating layer.

6. The apparatus of claim 1 wherein an optical beam directed through the first and second optical waveguides is polarized in a direction parallel to the insulating layer.

7. The apparatus of claim 6 wherein propagation of the optical beam through the first and second optical waveguides is bi-directional.

8. The apparatus of claim 1 wherein the semiconductor material layer includes silicon.

9. The apparatus of claim 1 wherein the insulating layer includes an oxide.

10. The apparatus of claim 1 wherein the first and second optical waveguides comprise single mode optical waveguides.

11. A method, comprising:
    directing an optical beam into a first optical waveguide included in a first semiconductor material layer of a semiconductor die;
    evanescently coupling the first optical waveguide to a second optical waveguide included in a second semiconductor material layer of the semiconductor die;
    modulating charge layers proximate to an insulating layer disposed in the semiconductor die between the first and second semiconductor material layers to control the evanescent coupling between the first and second optical waveguides in the first and second semiconductor material layers;
    separating the optical beam into first and second orthogonal polarization components including transverse magnetic field mode and transverse electric field mode components, wherein the optical beam directed into the first optical waveguide is the first orthogonal polarization component, wherein the first orthogonal polarization component is polarized parallel to the modulated charge layers proximate to the insulating layer; and
    directing the second orthogonal polarization component into a third optical waveguide and evanescently coupling the third optical waveguide to a fourth optical waveguide through second modulated charge layers, wherein the second orthogonal polarization component is polarized parallel to the second modulated charge layers.

12. The method of claim 11 further comprising modulating an effective index of refraction through the insulating layer between the first and second semiconductor material layers.

13. The method of claim 11 further comprising adjusting a coupling length of the evanescent coupling between the first and second optical waveguides.

14. The method of claim 11 further comprising modulating an electric field across the insulating layer disposed between the first and second semiconductor material layers.

15. The method of claim 11 further comprising combining the first and second orthogonal polarization components.

16. A system, comprising:
    an optical transmitter from which an optical beam is directed;
    a first optical device included in a semiconductor die having first and second semiconductor material layers separated by an insulating layer, the first and second semiconductor material layers including first and second optical waveguides, respectively, the first and second optical waveguides evanescently; coupled through first modulated charge layers proximate to the insulating layer, the first optical waveguide optically coupled to receive the optical beam, the first optical device to switch the optical beam between the first and second optical waveguides in response to a signal, wherein the optical beam includes a transverse magnetic mode and a transverse electric mode;

a first optical fiber coupled between the first optical waveguide and a first receiver; and a second optical fiber coupled between the second optical waveguide and a second receiver.

17. The system of claim 16 wherein the optical beam includes first and second orthogonal polarization components, the first optical waveguide optically coupled to receive the first orthogonal polarization component, the system further comprising:

a second optical device including third and fourth optical waveguides evanescently coupled through second modulated charge layers, the third optical waveguide optically coupled to receive the second orthogonal polarization component, the second optical device to switch the second orthogonal polarization component between the third and fourth optical waveguides in response to the signal, the first optical fiber coupled between the third optical waveguide and the first receiver, the second optical fiber coupled between the fourth optical waveguide and the second receiver.

18. The system of claim 17 wherein the first and second orthogonal polarization components are polarized parallel to the first and second modulated charge layers, respectively.

19. The system of claim 17 further comprising a first polarization beam splitter/combiner coupled between the optical transmitter and the first and second optical devices, the first polarization beam splitter/combiner to split the optical beam into the first and second orthogonal polarization components.

20. The system of claim 19 further comprising second and third polarization beam splitters/combiners coupled between the first and second optical devices and the first and second optical fibers, respectively, the second and third polarization beam splitters/combiner to combine the first and second orthogonal polarization components optically received from the first and second optical devices, respectively.

* * * * *

UNITED STATES PATENT AND TRADEMARK OFFICE
CERTIFICATE OF CORRECTION

PATENT NO.         : 7,437,026 B2  
APPLICATION NO. : 10/947633  
DATED               : October 14, 2008  
INVENTOR(S)       : Nicolaescu et al.

It is certified that error appears in the above-identified patent and that said Letters Patent is hereby corrected as shown below:

In column 9, at line 61, delete "couplin" and insert --coupling--.

Signed and Sealed this

Third Day of March, 2009

JOHN DOLL  
*Acting Director of the United States Patent and Trademark Office*